United States Patent

Thom et al.

[11] 3,944,007
[45] Mar. 16, 1976

[54] PLANETARY DRIVE SELF-PROPELLED IRRIGATION APPARATUS

[75] Inventors: Le Roy W. Thom, Minden; Rodney D. Eldred; Douglas R. Soderquist, both of Hastings, all of Nebr.

[73] Assignee: T - L Irrigation Company, Hastings, Nebr.

[22] Filed: Sept. 9, 1974

[21] Appl. No.: 504,127

[52] U.S. Cl. ............ 180/14 R; 180/43 B; 239/177
[51] Int. Cl.² ........................................... B60K 7/00
[58] Field of Search ......... 180/14 R, 43 B; 239/177, 239/212; 137/344

[56] References Cited
UNITED STATES PATENTS

| | | | |
|---|---|---|---|
| 3,255,968 | 6/1966 | Stafford | 239/212 |
| 3,386,661 | 6/1968 | Olson | 137/344 X |
| 3,599,664 | 8/1971 | Hotchkiss | 137/344 |
| 3,623,662 | 11/1971 | Reinke | 239/177 |
| 3,662,776 | 5/1972 | Bryant | 137/344 |
| 3,669,355 | 6/1972 | Jurgens | 239/177 |
| 3,713,296 | 1/1973 | Black | 239/177 X |
| 3,730,435 | 5/1973 | Zimmerer | 137/344 X |
| 3,737,000 | 6/1973 | Knobloch | 180/43 B |
| 3,771,719 | 11/1973 | Raso | 239/177 |

*Primary Examiner*—M. H. Wood, Jr.
*Assistant Examiner*—Terrance L. Siemens
*Attorney, Agent, or Firm*—Bertha L. MacGregor

[57] ABSTRACT

Disclosed herein is an hydraulic motor powered planetary drive self-propelled irrigating apparatus comprising a distributing pipe supported by a plurality of towers, each tower frame carrying hydraulic fluid feed and return lines for two motors which are part of each power unit. Each of the two motors is mounted in a bracket rigidly connected to one end of the tower frame, and has an output shaft coupled to the rotatable input shaft of a planetary gear reducer assembly housed in a rotatable hub casing driven by said gearing. The wheels of each tower are mounted on the rotatable hub casings of the two power units.

3 Claims, 7 Drawing Figures

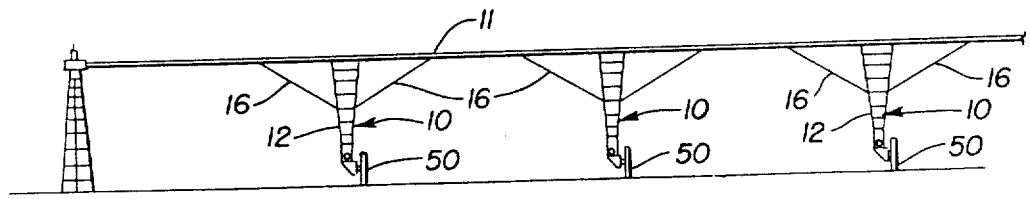
Fig. 1
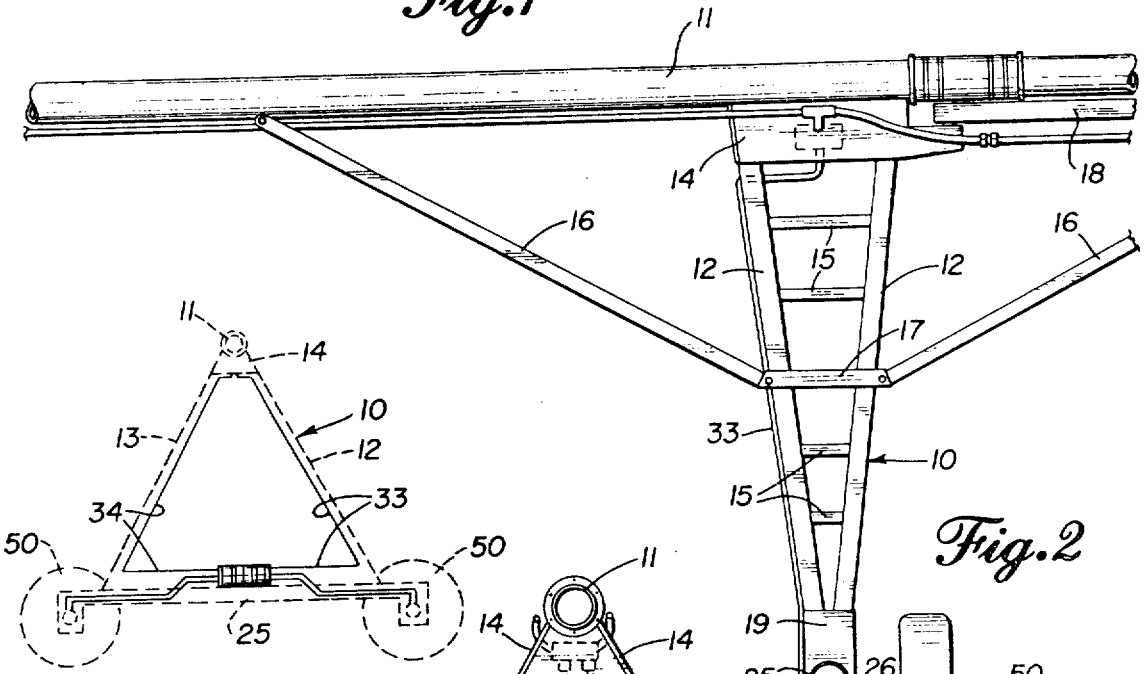
Fig. 2
Fig. 7
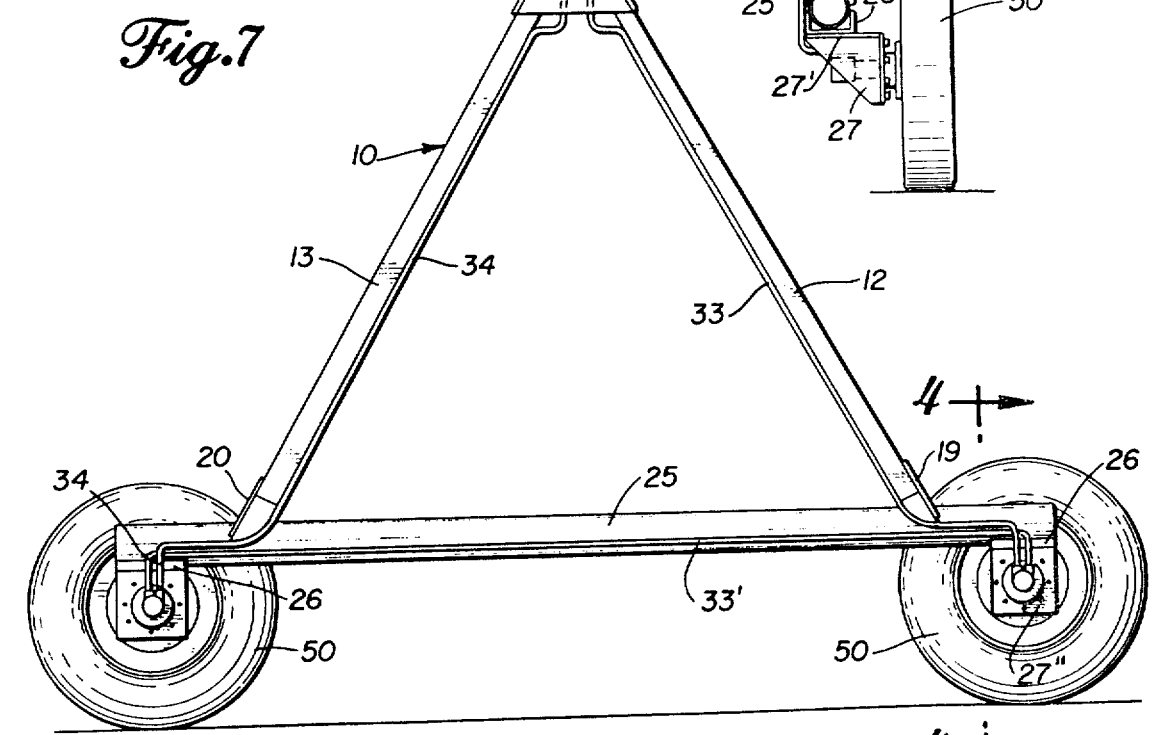
Fig. 3

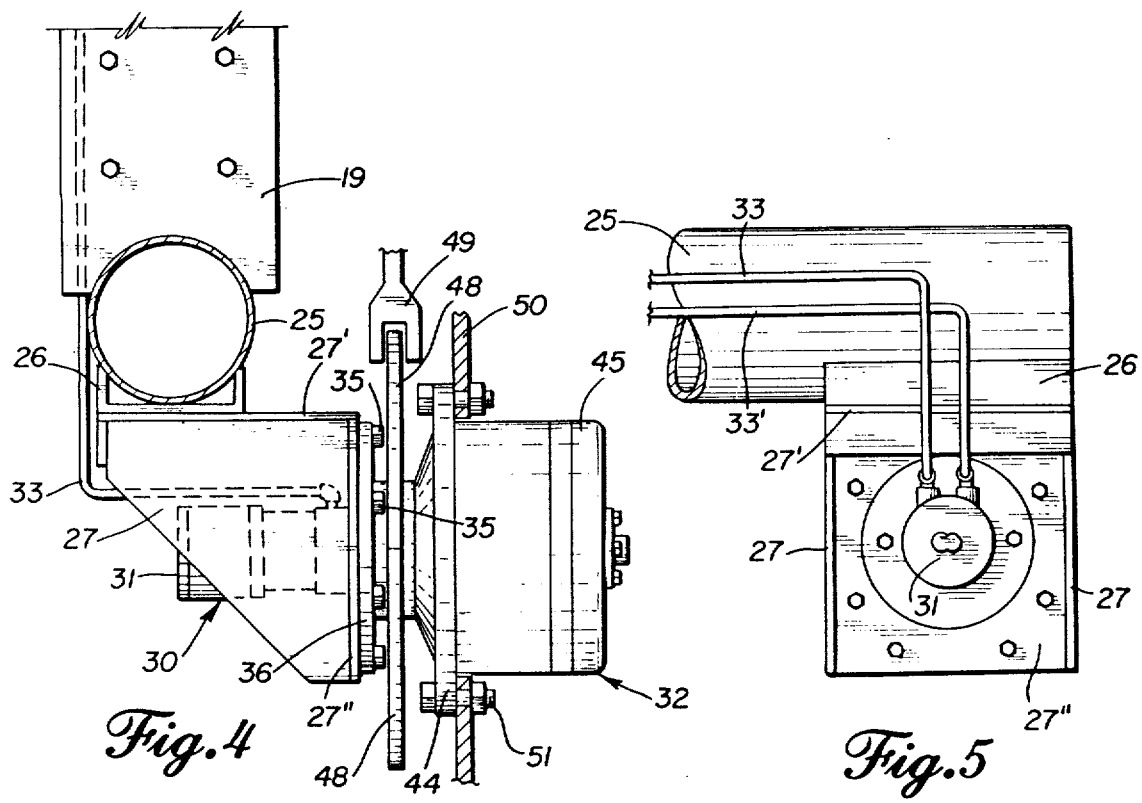
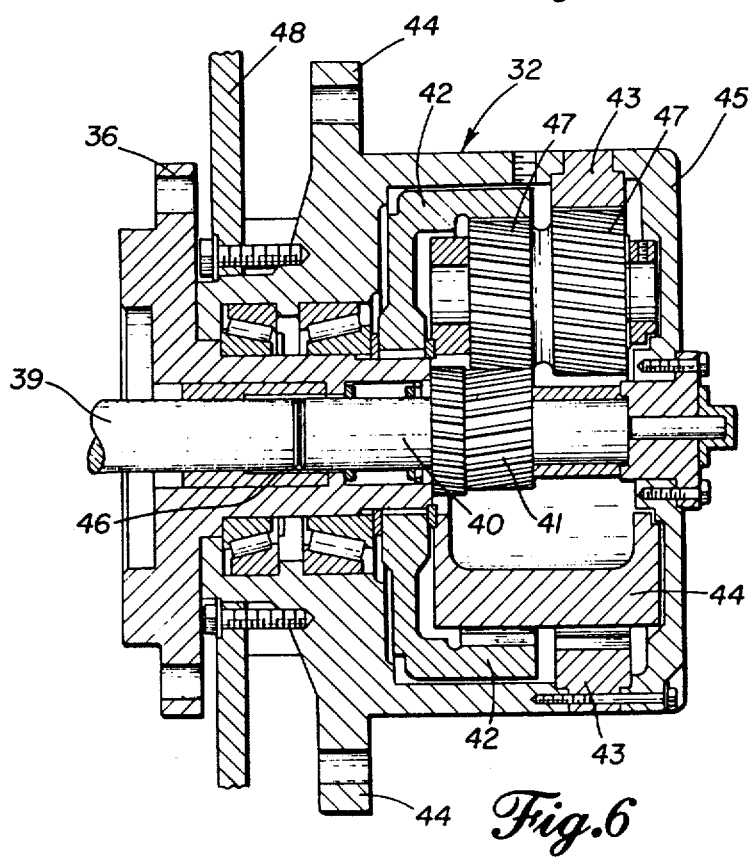

PLANETARY DRIVE SELF-PROPELLED IRRIGATION APPARATUS

This invention relates to self-propelled irrigation apparatus, and more particularly to a center pivot, wheel mounted system designed for irrigating by sprinkling large areas such as quarter sections of land.

The essential elements of such apparatus include a center pivot structure which is the axis of the apparatus, a distributing pipe provided with spaced apart nozzles, towers for supporting the distributing pipe, and motor driven means for driving the towers in annular paths around the pivot structure.

This invention is an improvement on the apparatus disclosed in U.S. Pat. No. 3,599,664, Aug. 17, 1971, assigned to the assignee of this application. The patented apparatus employs one hydraulic motor on each distributing pipe tower, the motor being operatively connected to two drive means on each tower, each of said two drive means comprising a pair of wheels on a track.

The object of this invention is to improve and simplify the wheel drive means and to provide each tower with driving means consisting of a pair of wheels, each mounted directly on the rotated casing of a reducing gear assembly, driven by an hydraulic motor concentric with said gear assembly. Hydraulic feed and return lines preferably are provided so that the two motors on the outer end tower are connected in parallel with a gear type flow divider to run both motors at the same speed, with full available pressure, instead of sharing available pressure with another motor. The pairs of motors on the towers between the pivot structure and the outer end tower may be run from hydraulic motors in series. The hydraulic motor in combination with the planetary reducer gear assembly and its rotated casing on which each wheel is mounted provides exceedingly compact and efficient drive means for the apparatus.

In the drawings:

FIG. 1 is an elevational side view of apparatus embodying the invention, showing part of the distributing pipe and towers which support the pipe between its center pivot structure and outer end tower (not shown).

FIG. 2 is an elevational end view of one of the towers and part of the distributing pipe on a larger scale.

FIG. 3 is an elevational side view of the apparatus of FIG. 2.

FIG. 4 is a transverse vertical sectional view, partly in elevation, in the plane of the line 4—4 of FIG. 3.

FIG. 5 is an elevational end view of the parts shown in FIG. 4.

FIG. 6 is a vertical sectional view through the reducing gear assembly of FIG. 4.

FIG. 7 shows an alternative arrangement of the hydraulic feed and return lines.

In the embodiment of the invention shown in the drawings, a plurality of towers 10 support a distributing pipe 11, which may be 1250 to 1300 ft. in length, with diameter of 4 to 12 inches, depending on the water supply. The distributing pipe is supported at one end on a center pivot structure and at its outer end on an outer end drive unit, the intermediate towers being spaced 90 to 200 feet apart, as is well known in the art.

Each tower 10 comprises a frame having pairs of channel bars 12 and 13, the pairs of bars being inclined upwardly toward each other and connected at their upper ends to mounting plates 14, as shown in FIG. 3. The bars 12 of one pair diverge upwardly and are braced by cross bars 15, as shown in FIG. 2. The bars 13 of the other pair diverge and are similarly braced by bars 15. Braces 16 extend upwardly from a cross bar 17 to the horizontal support member 18 on which the distributing pipe 11 is mounted. At their lower ends the channel bars 12 are fastened to a plate 19, and the channel bars 13 are fastened to a plate 20. The plates 19 and 20 bear on a horizontal cross pipe 25, which together with the channel bars 12 and 13 constitute the main frame of each tower 10.

The pipe 25 rests in an open top channel bar 26 rigidly connected at each of its ends to a bracket 27 which comprises a horizontal plate 27' and vertical plate 27'', as well as the triangular side members between said plates. Each bracket 27 supports a power unit 30 comprising an hydraulic motor 31 and gear reducing assembly in a rotatable hub casing 32, on which a wheel is mounted.

An hydraulic feed line 33 supplies compressed fluid from a source to each of the motors 31 on a tower, and a return line 34 conveys the fluid from each motor, as shown in FIG. 7. This arrangement is preferred for the two motors on the outer end drive unit, to provide full available pressure for each motor. The planetary drive means on the intermediate towers may use hydraulic motors in series, with the feed line 33 supplying one motor 31, and through cross line 33' feeding the other motor, with return flow through line 34, as shown in FIG. 3.

The motor 31 has its casing fixedly mounted in the bracket 27 in a position concentric with the hub casing 32. A spindle 36, part of the gear reducing assembly in hub casing 32, is bolted to the bracket plate 27'' by bolts 35. The motor output shaft 39 is coupled to the assembly input shaft 40 for rotation of the shaft 40, and transmission of rotary movement to the hub casing 32 through the sun gear 41, internal gear 42, ring gear 43, carrier assembly 44, planetary gear 47, coupling 46. A brake disc is designated 48, and brake caliper 49. A wheel 50 is bolted at 51 to the hub casing 32 to rotate with the hub.

Thus the drive unit parts are compactly and efficiently mounted for direct transmission of power to the rotated hub casing 32 and wheel 50 mounted thereon, with the hydraulic motor 31 supported on one side of the bracket plate 27'' and the spindle 36 of the gear assembly mounted on the opposite side of the bracket plate for transmission of rotary motion by the motor shaft 39 to the reducer gear shaft 40 and intermediate gearing to rotate the hub casing 32.

We claim:

1. An hydraulic motor powered planetary drive self-propelled irrigation apparatus comprising
   a. a water distributing pipe,
   b. a plurality of towers supporting said distributing pipe,
   c. each tower having a generally triangularly shaped frame including a lower horizontal tubular member supported in a U-shaped flat bottomed open top cross member,
   d. hydraulic fluid feed and return lines carried by said frame,
   e. a bracket having a flat horizontal top plate fastened to the bottom of the open top cross member and extending laterally beyond said cross member, and a vertically downwardly extending plate depending from the edge of the top plate of the bracket remote from the cross member,
f. a hydraulic motor mounted on said downwardly extending plate of the bracket on the side beneath said cross member, said motor having an output shaft extending through said plate,
g. a gear reducer assembly housed in a rotatable hub casing and mounted on said depending bracket plate on the side opposite the motor, and having an input shaft aligned with the motor shaft, and
h. a wheel mounted on the hub casing and rotatable about an axis aligned with the motor shaft axis, the mounting of the motor and hub casing on opposite sides of the bracket disposing the motor substantially beneath and in line with the frame cross member and disposing the wheel in an offset position laterally of the frame.

2. The apparatus defined by claim 1, in which one of the plurality of towers is an outer end tower, and each of the motors of said outer end tower is connected to hydraulic feed and return lines for supplying full available pressure to both motors, and the motors of each of the other towers are connected in series to an hydraulic fluid and return line.

3. The apparatus defined by claim 1, in which each tower frame comprises four side bars, two of which in side elevation converge upwardly, and two of which in end elevation diverge upwardly, the tubular horizontal bar connecting the lower ends of said side bars, and mounting plates joining the lower ends of the diverging bars and bearing on said tubular horizontal bar in the area above said motor mounting bracket.

* * * * *